No. 820,266. PATENTED MAY 8, 1906.
J. W. SMITH.
VEHICLE BRAKE.
APPLICATION FILED OCT. 25, 1905.
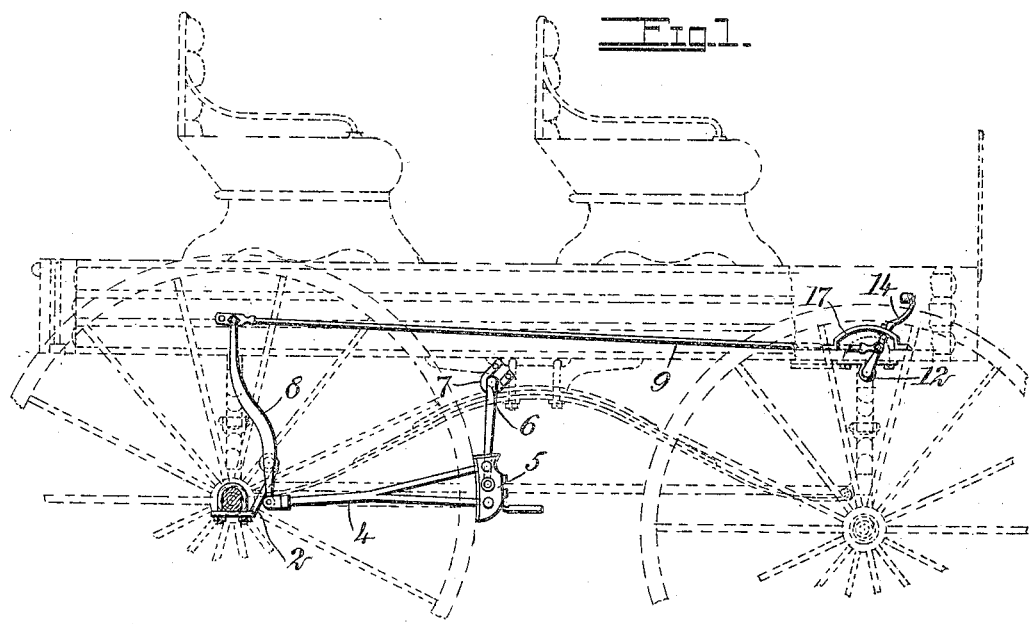
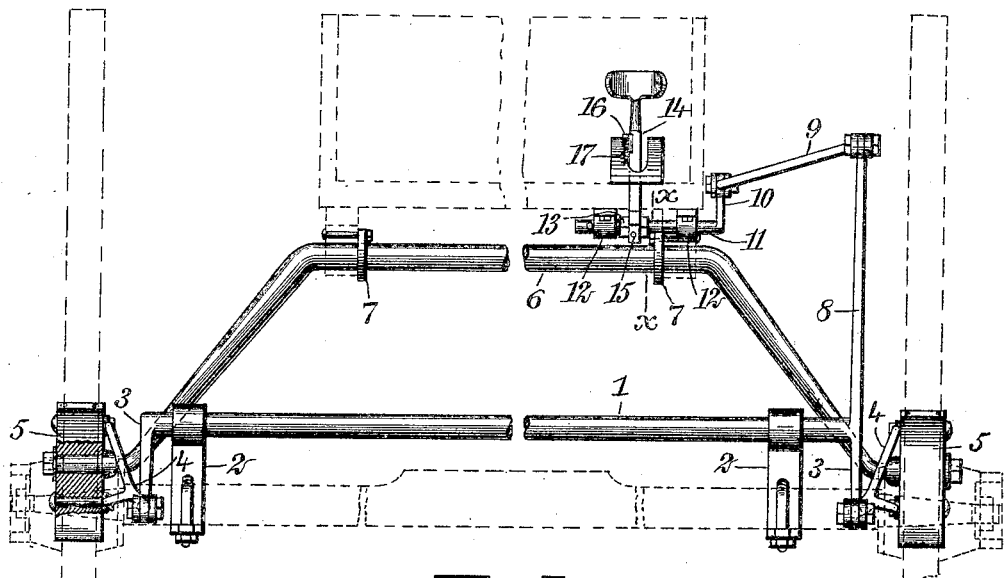
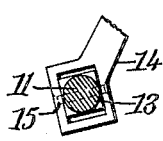
WITNESSES:
L. Almquist
C. R. Ferguson
INVENTOR
John W. Smith
BY Munn & Co.
ATTORNEYS

UNITED STATES PATENT OFFICE.

JOHN W. SMITH, OF CONGRESS, ARIZONA TERRITORY.

VEHICLE-BRAKE.

No. 820,266.  Specification of Letters Patent.  Patented May 8, 1906.

Application filed October 25, 1905. Serial No. 284,315.

*To all whom it may concern:*

Be it known that I, JOHN W. SMITH, a citizen of the United States, and a resident of Congress, in the county of Yavapai, Arizona Territory, have invented a new and Improved Vehicle-Brake, of which the following is a full, clear, and exact description.

This invention relates to improvements in brakes for vehicles, such as road-wagons, trucks, and the like, the object being to provide a brake of simple construction, that may be easily adjusted to a vehicle, that may be readily applied by suitable pressure to the rear wheels, and having no parts liable to get out of order.

I will describe a vehicle-brake embodying my invention and then point out the novel features in the appended claim.

Reference is to be had to the accompanying drawings, forming a part of this specification, in which similar characters of reference indicate corresponding parts in all the figures.

Figure 1 is a side view of a vehicle-brake embodying my invention. Fig. 2 is a front view thereof, partly in section; and Fig. 3 is a section on the line x x of Fig. 2.

It may be here stated that the brake is especially adapted for use on wagons having either side or cross springs, as it acts upon the rear wheels equally well in any position the vehicle-body may be vertically with relation to the wheel-axle.

Referring to the drawings, 1 designates a rock-shaft having bearings in clips 2, secured to the rear axle of the vehicle and having at its ends downwardly-extended arms 3, and pivotally connected to these arms 3 are forwardly-extending bars 4, which have pivotal connection with the brake-shoes 5. These brake-shoes have a slight rotary motion on the downwardly-extended ends of a rock-bar 6, having bearings in hangers 7, attached to the under side of the vehicle-body. It will be noted that the rods 4 have divergent portions at their forward ends which engage, respectively, with the brake-shoes above and below the connection of the said shoes with the rock-bar 6. At one end the rock-shaft 1 has an upwardly-extended lever 8, from which a draw-bar 9 extends to the crank 10 of a crank-shaft 11, mounted to turn in hangers 12, secured to the bottom of the vehicle-body just forward of the driver's seat or at the forward end of the body, as illustrated in Fig. 1. The crank-shaft 11 has an angular portion 13, to which is attached a lever 14, said lever passing through a slot in the bottom of the vehicle-body. As shown in Fig. 3, the lever 14 has an opening somewhat larger than the angular portion 13, and is secured thereto by means of a rivet 15. By this construction the lever has a slight lateral movement on the crank-shaft, so that a tooth 16 on said lever may be engaged with or disengaged from a segment-rack 17, attached to the inner side of the vehicle-body.

While I have shown the lever 14 as designed to be operated by the foot of a driver, it is obvious that it may be extended upward as a hand-lever without departing from the spirit of my invention.

In operation as the lever 14 is forced forward the brake-shoes will be moved into engagement with the rear wheels of the vehicle and may be held as adjusted by engaging the tooth 16 with one of the teeth of the segment-rack 17.

Having thus described my invention, I claim as new and desire to secure by Letters Patent—

In a vehicle-brake, a rock-shaft supported on the rear axle of the vehicle and having downwardly-extended ends, a rock-bar supported underneath the vehicle-body, brake-shoes having swinging connection with said rock-bar, rod connection between the downwardly-extended ends of the rock-shaft and said shoes, an upwardly-extended lever on one end of the rock-shaft, a crank-shaft, a draw-rod connection between the crank of said crank-shaft and the lever on the rock-shaft, a lever extended from said crank-shaft through the bottom of the vehicle-body, said lever having lateral swinging motion on the crank-shaft, and a segment-rack for engaging with said lateral swinging lever.

In testimony whereof I have signed my name to this specification in the presence of two subscribing witnesses.

JOHN W. SMITH.

Witnesses:
 CHARLES CALHOUN,
 H. C. HOFFMAN.